United States Patent

[11] 3,622,359

| [72] | Inventors | Leslie F. Pither<br>Maumee;<br>Paul J. Sauve, Sylvania, both of Ohio |
|---|---|---|
| [21] | Appl. No. | 840,470 |
| [22] | Filed | July 9, 1969 |
| [45] | Patented | Nov. 23, 1971 |
| [73] | Assignee | Owens-Illinois, Inc. |

[54] FLUORINE OPAL GLASSES
6 Claims, No Drawings

[52] U.S. Cl. ................................................ 106/54, 106/52
[51] Int. Cl. ................................................ C03c 3/04
[50] Field of Search ............................ 106/54, 52, 39 DU; 65/33

[56] References Cited
UNITED STATES PATENTS

| 2,224,469 | 12/1940 | Blau | 106/52 X |
| 2,571,242 | 10/1951 | Hood | 106/52 |
| 2,921,860 | 1/1960 | Stoorey | 106/52 |
| 3,238,085 | 3/1966 | Hayami et al. | 106/39 X |
| 3,275,492 | 9/1966 | Herbert | 106/54 X |
| 1,304,622 | 5/1919 | Sullivan et al. | 106/54 |
| 2,527,693 | 10/1950 | Armistead | 106/54 X |
| 3,413,133 | 11/1968 | Stalego | 106/50 |

OTHER REFERENCES

Movey, G. D.; Properties of Glass; New York 1954 p. 285 (TP857M67)

*Primary Examiner*—James E. Poer
*Assistant Examiner*—W. R. Satterfield
*Attorneys*—Paul L. Sabatine and E. J. Holler

ABSTRACT: Borosilicate opal glasses comprising fluorine and certain glass-forming oxides that have properties suitable for making opal glass items on conventional glass forming machinery. These glasses are substantially free of lithia and alkaline earth metal oxides.

FLUORINE OPAL GLASSES

BACKGROUND OF THE INVENTION

The present invention relates to opal glass and, more particularly, to novel opal glasses composed of an unobvious composition of opal glass-forming constituents. Specifically, the invention concerns new high glossy opal glasses possessing unique properties such as a lower thermal coefficient of expansion, and a quicker setting time and other like properties suitable for fabricating articles of manufacture.

Opal glasses of different types are generally known to the prior art. The opalizing agents employed heretobefore usually included considerable amounts of members of the second group of the periodic table of elements such as magnesium, calcium, strontium, barium, and zinc to form with other chemical elements, for example, sulfur for producing sulfides and the like, for making opal type glasses. Other known chemicals that have often been utilized by the prior art for making opal glasses usually include phosphates, chlorides, plumbumates, chromates and the like.

While the above-mentioned opacifying agents have been employed by the prior art, their use has not been universal because the opal glass produced may be slightly colored or it may possess physical and chemical properties that make it unsuitable for manufacturing articles by known machine production techniques. These just mentioned features of the prior art opal glasses tend to diminish the importance of the opal glasses and also present to the art the need for an inventive solution in the opal glass art.

The persisting need to provide opal glasses with acceptable properties and suitable opal white color is a primary purpose of this invention.

Another purpose of the present invention is to provide opal glasses with physical properties that make the opal glasses suitable for making items by machine technique, with the added aspects of a lower thermal expansion and a faster setting time for the glass.

Yet another purpose of this invention is to provide opal glasses that are seemingly of a pure white opal color.

Still yet another purpose of the present invention is to provide a crystallized opal glass that is essentially free of RO glass-forming agent.

Yet still a further object of the present invention is to provide a novel opal glass that is free of lithium oxide.

Still yet a further object of the present invention is to provide an opal glass that is essentially free of both divalent metal oxides and lithium oxide.

The specific nature of the invention, as well as other objects and advantages thereof, will become apparent to those skilled in the art from the following detailed description.

SUMMARY OF THE INVENTION

The invention concerns novel opal glass compositions of matter that are essentially free of elements of the second group and possess a controlled coefficient of thermal expansion between $65\times10^{-7}/°C.(0°-300° C.)$ to $75\times10^{-7}/°C.(0°-300° C.)$. The opal glass can be used to machine manufacture items of commerce such as items used by "Milady" in the form of jars and bottles for cold cream, vanishing cream, deodorants and the like.

DESCRIPTION OF EMBODIMENTS OF THE INVENTION

The present invention broadly consists of producing a novel, unobvious, chemically stable and durable hospital while opal glass that is very economical and suitable for machine production of containers and other items of commerce.

The opal glasses of the present invention are composed of a balanced intimate union of select glass-forming oxides to give the desired opal glass with desirable properties. The subject opal glass compositions of matter consists essentially of silicon dioxide ($SiO_2$), aluminum oxide ($Al_2O_3$), sodium oxide ($Na_2O$), potassium oxide ($K_2O$), boric oxide ($B_2O_3$), fluorine ($F_2$), arsenic oxide ($As_2O_3$) and antimony oxide. The glasses of the present invention containing the above oxides generally consist of about 70 to 75 weight percent $SiO_2$, 7 to 9 weight percent $Al_2O_3$, about 7 to 9 weight percent $Na_2O$, about 3 to 7 weight percent $K_2O$, about 5 to 9 weight percent $F_2$, about 1 to 3 weight percent $B_2O_3$, and a member selected from the group consisting essentially of 0 to 0.4 weight percent $As_2O_3$, and 0 to 0.4 weight percent $Sb_2O_3$.

The opal glasses as described supra are essentially free of metal oxides which are usually art identified as opacifying agents (RO); and, when members of the RO group are present in the subject opal glasses they are there as traces from raw materials as impurities. The use of the oxides of elements of the second group in the periodic table of elements is avoided because the present glasses containing RO members exhibit opacity decreases with the addition of these oxides. Additional inventive features that demonstrate the novel glass system disclosed herein are the use of boric oxide and the use of potassium oxide. The addition of more than three percent boric oxide into the system is undesirable because excess boric acid tends to reduce the opacity of the subject glasses. The successful use of potassium oxide in the opal system appears to be unexpected because an opal glass cannot be made without it, that is, $K_2O$ is necessary to make the present opal glasses, and, without its presence it is seemingly difficult to get the desired opacity and necessary glass qualities for machine production. The present glasses are, in addition to the above, further unique because they do not contain any $Li_2O$. Heretobefore, it was usually deemed necessary that opal glasses possess $Li_2O$ for producing opal effects and for adapting the glass for machine production techniques. The present opal glasses do not require any $Li_2O$ for obtaining these results.

The opal glasses of the invention may be produced from conventional glass-making materials properly compounded and thoroughly mixed so as to yield, upon processing, glasses of the desired ultimate composition. Suitable batch materials include sand, soda ash, mepheline syenite, niter, antimony oxide, potash, Borax, Kona Quintus Quartz, boric acid, sodium silicofluoride, potassium nitrate, sodium nitrate and the like. Of course, functionally equivalent oxides, carbonates, fluorides, silicates, or any other form which does not adversely affect the subject glass or disturb the opal properties may be utilized for forming the subject glasses.

In general, the opal glasses of the present invention are made by mixing together and then placing in a refractory crucible or tank furnace the powdered batch components in the form of oxides, carbonates, fluorides, or other compounds which will yield the opal glass. The crucible and its contents are then heated in a furnace to about 2500° F. to melt the batch, and the crucible is maintained at such temperature for about 2 hours to 5 hours to insure complete melting of the batch components. The glass can be melted in an electric or gas heated furnace. The glass is melted under an air atmosphere and at atmospheric pressure. The molten glass is then formed into desired shapes using well known machine forming techniques, such as pressing, drawing, blowing, etc.

The above objects, features, advantages, and examples are not to be construed as limiting the instant invention as these and other features will become apparent to those skilled in the art. The following examples are merely illustrative of the present invention and should not be considered limiting its scope in any way.

EXAMPLE 1

An opal glass was prepared by thoroughly blending 2462 grams of sand, 87 grams of soda ash, 1700 grams of nepheline syenite, 36 grams of niter, 500 grams of sodium silicofluoride, 317 grams of antimony oxide and 73 grams of Borax in a commercially V-blender until a homogeneous mixture was obtained. The mixture was then transferred to a crucible and melted at 2500° F. for about 5 hours under an air atmosphere to give a homogeneous melt. The opal glass had an analysis of 72.8 weight percent $SiO_2$, 6.0 weight percent $F_2$, 8 weight percent $Al_2O_3$, 8.5 weight percent $Na_2O$, 6.0 weight percent $K_2O$, 0.1 weight percent of the impurity CaO, 1.0 weight percent $B_2O_3$, and 0.1 weight percent $As_2O_3$. The glass had an oxygen correction of −2.52, and opacity of 0.160 inch. The opal glass prepared according to this example has a lower thermal coefficient of expansion and faster setting time than conventional soda lime opal glasses. These features make it possible to obtain about a 10 percent increase in machine speed over conventional soda lime opal glasses.

EXAMPLE 2

A hospital white opal glass was prepared following the procedure set forth in example 1. The batch for the present glass consists of 8591 grams of sand, 113 grams of niter, 3883 grams of nepheline syenite, 336 grams of calcined alumina, 671 grams of borax, 1851 grams of sodium silicofluoride, 807 grams of potash and 18 grams of antimony oxide. The opal glass formed from this batch had an analysis of 72.4 weight percent $SiO_2$, 7.0 weight percent $F_2$, 7.85 weight percent $Al_2O_3$, 7.9 weight percent $Na_2O$, 4.7 weight percent $K_2O$, 0.1 weight percent of the impurity CaO, 2.9 weight percent $B_2O_3$, and 0.11 weight percent $As_2O_3$. The glass had an oxygen equivalent of −2.94, an opacity of 0.155 inch, a linear thermal coefficient of expansion of $72.9 \times 10^{-7}$ in/$^\circ$C.(0°–300° C.), an annealing point of 545, a strain point of 495, and a density of 2.3406.

EXAMPLE 3

An opal glass was prepared according to the procedure set forth in example 1. The batch reagents were as follows: 2497 grams of sand, 36 grams of niter, 1527 grams of nepheline syenite, 33 grams calcined alumina, 163 grams of Borax, 625 grams of sodium silicofluoride, 232 grams of potash, 5.5 grams of antimony oxide and 5.5 grams of arsenic. The freshly formed hospital white opal glass had an analysis of 72.2 weight percent $SiO_2$, 7.5 weight percent $F_2$, 7.85 weight percent $Al_2O_3$, 8.5 weight percent $Na_2O$, 4.7 weight percent $K_2O$, 0.1 weight percent CaO, 2.25 weight percent $B_2O_3$, 0.11 weight percent $As_2O_3$ and 0.11 weight percent $Sb_2O_3$. The glass had an oxygen equivalent of −3.16 and an opacity of 0.125 inch.

EXAMPLE 4

An opal glass was prepared according to the procedure set forth in example 1. The homogeneous batch consists of 2529 grams of sand, 36 grams of niter, 1448 grams of nepheline syenite, 52 grams of calcined alumina, 145 grams of Borax, 667 grams of sodium silicofluoride 238 grams of potash and 5.5 grams of antimony oxide. The glass had an analysis of 72.1 weight percent $SiO_2$, 8.0 weight percent $F_2$, 7.86 weight percent $Al_2O_3$, 8.5 weight percent $Na_2O$, 4.7 weight percent $K_2O$, 0.1 weight percent CaO, 2.0 weight percent $B_2O_3$, and 0.1 weight percent $As_2O_3$. The glass had an oxygen correction of −3.37 and an opacity of 0.125 inch.

The opacity reported in the above examples was measured by the art standard shadow line test. The test is performed as follows: Samples are made by gathering the glass sample from a clear glassy state. The gather was then marvered for shape, and at this time the gather was completely opaque. The gob (parison) was then blown and then placed in a mold for final blow. The blown samples are then placed on a uniformly backlighted screen and a point is marked at which a predetermined line was no longer visible. The predetermined line was made according to standard laboratory measuring procedures. The test is made by marking samples of opal glass with a black marker to give a uniform line or mark on the opal glass. Next, the marked opal samples are placed against an evenly lite background and the point at which the marked line was no longer visible was measured with a micrometer. This reading tells the degree of opacity. The thinner the micrometer measurement at the point where the line disappears indicates a higher degree of opacity for the opal glasses. The lines for the present samples was about 0.125 inch to 0.160 inch, which seemingly indicates that lighter walled container with good strength can be made from the present opal glasses. Generally, commercially available opal glasses have a line value in excess of 0.225 inch.

In the results presented herein, the conventional art oxygen correction was made for equivalent amounts of fluorine. The fluorine set forth in the glass compositions is understood to be present in the glass in some combined form but not as a gas. It is not exactly known how this fluorine is combined, but it is assumed to be combined in place of some of the oxygen. In glass compositions it is customary to list the oxides. In this case, where some fluorine is present, it is convenient to show its amount in percent by weight as fluorine and then subtract from the sum total percentage its stoichiometric equivalent of oxide in percent by weight.

The opal glasses of the present invention can be used for making many useful items of science and commerce. For example, the opal glasses are useful for light diffusion panels, for decorative qualities, for making opal tableware, opal kitchenware, for making jars, backing in thermometers, bottles for creams and the like.

The term crystallized as used herein means an opal glass that derives its opacity from the formation of fluoride crystals such as sodium fluoride and potassium fluoride. Generally, in the prior art opal glasses, the opacity results from am immiscible glassy phase separating from the matrix glass.

According to the provisions of the patent statutes, the patentable invention has been set forth to enable those skilled in the art to which the invention pertains to understand and practice the invention. It will be apparent that changes can be made in the light of the disclosure without departing from its scope and that the invention may be practiced otherwise than as described herein.

We claim:

1. An opal glass consisting essentially of the following composition wherein the ingredients are set forth in percent by weight: 70 to 75 percent $SiO_2$, 7 to 9 percent $Al_2O_3$, 7 to 9 percent $Na_2O$, 3 to 7 percent $K_2O$, 5 to 9 percent $F_2$, 1 to 3 percent $B_2O_3$, and a member selected from the group consisting of 0 to 0.4 percent $As_2O_3$ and 0 to 0.4 percent $Sb_2O_3$, and wherein the total glass forming ingredient percent exceeds 100 percent by an amount of oxygen stoichiometrically equivalent to the amount of fluorine present, said amount of oxygen not being present in the opal glass, said glass being free of lithia and essentially free of alkaline earth metal oxides, and having an opacity in the range of 0.125 to 0.160 inch as determined by the shadow line test.

2. An opal glass according to claim 1 wherein the opal glass consists essentially of 72.8 percent $SiO_2$, 6.0 percent $F_2$, 8 percent $Al_2O_3$, 8.5 percent $Na_2O$, 6.0 percent $K_2O$, 1.0 percent $B_2O_3$ and 0.1 percent $As_2O_3$.

3. An opal glass according to claim 1 wherein the opal glass consists essentially of 72.4 percent $SiO_2$, 7.0 percent $F_2$, 7.85 percent $Al_2O_3$, 7.9 percent $Na_2O$, 4.7 percent $K_2O$, 2.9 percent $B_2O_3$ and 0.11 percent $As_2O_3$.

4. An opal glass according to claim 1 wherein the opal glass consists essentially of 72.2 percent $SiO_2$, 7.5 percent $F_2$, 7.85 percent $Al_2O_3$, 8.5 percent $Na_2O$, 4.7 percent $K_2O$, 2.25 percent $B_2O_3$, 0.11 percent $As_2O_3$ and 0.11 percent $Sb_2O_3$.

5. An opal glass according to claim 1 wherein the opal glass consists essentially of 72.1 weight percent $SiO_2$, 8.0 percent $F_2$, 7.86 percent $Al_2O_3$, 8.5 percent $Na_2O$, 4.7 percent $K_2O$, 2.0 percent $B_2O_3$ and 0.1 percent $As_2O_3$.

6. An opal glass according to claim 1 wherein said opal glass has a linear coefficient of thermal expansion of $65 \times 10^{-7}/^\circ$C(0°–00° C.) to $74 \times 10^{-7}/^\circ$C(0°–300° C.) and wherein said opal glass is essentially free of divalent metal oxides.

* * * * *

UNITED STATES PATENT OFFICE
CERTIFICATE OF CORRECTION

Patent No. 3,622,359        Dated   November 23, 1971

Inventor(s)   Leslie F. Pither et al.

It is certified that error appears in the above-identified patent and that said Letters Patent are hereby corrected as shown below:

Column 1, line 66, "while" should read -- white --. Column 2, line 67, "2462" should read -- 2464 --. Column 4, line 69, "(0°-00° C.)" should read -- (0°-300° C.) --.

Signed and sealed this 16th day of May 1972.

(SEAL)
Attest:

EDWARD M. FLETCHER, JR.         ROBERT GOTTSCHALK
Attesting Officer               Commissioner of Patents